(12) United States Patent
Nikitin et al.

(10) Patent No.: US 7,446,977 B2
(45) Date of Patent: Nov. 4, 2008

(54) RECORDING HEADS HAVING ELECTRICAL PADS ON MULTIPLE SURFACES

(75) Inventors: Vladimir Nikitin, Campbell, CA (US); David J. Seagle, Morgan Hill, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 557 days.

(21) Appl. No.: 11/043,490

(22) Filed: Jan. 26, 2005

(65) Prior Publication Data

US 2006/0164760 A1 Jul. 27, 2006

(51) Int. Cl.
*G11B 5/60* (2006.01)
(52) U.S. Cl. .................................. 360/234.5
(58) Field of Classification Search ............... 360/234.5, 360/234.6
See application file for complete search history.

(56) References Cited

U.S. PATENT DOCUMENTS

| 5,175,938 | A | | 1/1993 | Smith | |
|---|---|---|---|---|---|
| 5,610,783 | A | * | 3/1997 | Maffitt et al. | 360/234.5 |
| 6,709,321 | B2 | | 3/2004 | Ishizaki et al. | |
| 6,793,557 | B2 | | 9/2004 | Bunch et al. | |
| 6,927,946 | B2 | * | 8/2005 | Shum et al. | 360/294.3 |
| 2003/0202289 | A1 | * | 10/2003 | Shum et al. | 360/294.3 |
| 2004/0070880 | A1 | * | 4/2004 | Fu et al. | 360/234.5 |
| 2004/0179307 | A1 | | 9/2004 | Burbank et al. | |
| 2005/0083611 | A1 | * | 4/2005 | Shum et al. | 360/245.8 |

* cited by examiner

*Primary Examiner*—Allen T Cao
(74) *Attorney, Agent, or Firm*—Duft Bornsen & Fishman, LLP

(57) ABSTRACT

A recording head is disclosed that includes electrical pads on multiple surfaces. The recording head includes a substrate portion abutting a deposited portion. The deposited portion includes an air bearing surface (ABS) (or bottom surface), an end surface, and at least one other surface. The end surface is the surface traditionally used by head designers for electrical pads. In accord with the invention, one or more electrical pads are included on the other surfaces of the deposited portion (i.e., a surface other than the end surface). Electrical pads may also be included on the end surface.

25 Claims, 5 Drawing Sheets

RECORDING HEADS HAVING ELECTRICAL PADS ON MULTIPLE SURFACES

BACKGROUND OF THE INVENTION

1. Field of the Invention

The invention is related to the field of magnetic disk drive systems, and in particular, to recording heads of a magnetic disk drive system that include electrical pads on multiple surfaces.

2. Statement of the Problem

Many computer systems use magnetic disk drives for mass storage of information. Magnetic disk drives typically include one or more recording heads (sometimes referred to as sliders) that include read elements and write elements. A suspension arm holds the recording head above a magnetic disk. When the magnetic disk rotates, air generated by the rotation of the magnetic disk causes an air bearing surface (ABS) of the recording head to ride a particular height above the magnetic disk. The height depends on the shape of the ABS. As the recording head rides on the air bearing, an actuator moves an actuator arm that is connected to the suspension arm to position the read element and the write element over selected tracks of the magnetic disk.

To read data from the magnetic disk, transitions on a track of the magnetic disk create magnetic fields. As the read element passes over the transitions, the magnetic fields of the transitions modulate the resistance of the read element. The change in resistance of the read element is detected by passing a sense current through the read element and then measuring the change in voltage across the read element. The resulting signal is used to recover the data encoded on the track of the magnetic disk.

Recording heads are typically manufactured on a substrate wafer. Thin films are deposited on the substrate to create an array of recording heads on the wafer. The wafer is then cut into rows, and each row of recording heads is lapped. The rows are then cut into individual recording heads. The ABS of each individual recording head is then milled to a desired shape.

FIG. 1 illustrates a typical recording head 100. Recording head 100 includes a substrate portion 110 abutting a deposited portion 120. Deposited portion 120 comprises the portion of the recording head formed by depositing the thin films, and the substrate portion 110 comprises the wafer portion. A read element and a write element (not shown) are embedded in deposited portion 120. Electrical pads 142-143 are located on an end surface 122 of deposited portion 120. End surface 122 is perpendicular to an air bearing surface (ABS) 130 of recording head 100. ABS 130 is the bottom surface as recording head 100 sits on the page of FIG. 1. Electrical pads 142 connect to the write element through electrical connections (not shown) embedded in deposited portion 120. Electrical pads 143 connect to the read element through electrical connections (not shown) embedded in deposited portion 120. Electrical pads 142-143 provide a contact point to the read element and the write element.

Head designers are designing recording heads that have other electrical elements in addition to the read element and the write element. Some of the electrical elements are temporary and some are permanent. One example of a temporary electrical element is an electrical lapping guide used for controlling the depth of the lapping process. One example of a permanent electrical element is a heater. For each of these electrical elements that are added to a recording head, electrical pads are needed to provide a connection point for the elements. In FIG. 1, electrical pads for the additional electrical elements would be located on end surface 122 along with electrical pads 142-143. Thus, if a heater is included in recording head 100, then end surface 122 would include six electrical pads. If a heater and an electrical lapping guide are included in recording head 100, then end surface 122 would include eight electrical pads (assuming eight electrical pads would fit on end surface 122).

One problem facing head designers is having enough surface area on the end surface for the electrical pads needed for the electrical elements in the recording heads. As head designers add more electrical elements, more electrical pads need to be added. At the same time, the overall size of the recording heads is being reduced to implement smaller form factor disk drives. Due to the size of a typical recording head, a limited number of electrical pads (such as six or seven) can be included on the end surface of the recording head. Head designers unfortunately may desire to include more electrical elements than allowed by the limited number of electrical pads.

SUMMARY OF THE SOLUTION

The invention solves the above and other related problems with a recording head that includes electrical pads on surfaces other than just the end surface of the deposited portion. In one embodiment, the recording head includes a substrate portion abutting a deposited portion. The deposited portion includes an air bearing surface (ABS), an end surface, and at least one other surface. According to the invention, the other surface includes one or more electrical pads for an electrical element.

For instance, for a recording head having rectangular surfaces, the deposited portion comprises the ABS (or bottom surface), the end surface, a top surface, a first side surface, and a second side surface. The end surface is substantially perpendicular to the ABS (or bottom surface). The top surface is an opposite surface to the ABS and is substantially parallel to the ABS. The side surfaces are substantially parallel to one another and substantially perpendicular to the ABS.

Electrical pads may be included on one or more of the top surface, the first side surface, and the second side surface of the deposited portion. For instance, the top surface may include one or a plurality of electrical pads. Alternatively or additionally, the first side surface may include an electrical pad. Alternatively or additionally, the second side surface may include an electrical pad. Electrical pads may also be included on the end surface.

Advantageously, more electrical pads may be included on a recording head as surfaces other than just the end surface are being utilized for electrical pads. This allows head designers to include more electrical elements in the recording heads without being limited to the space available on the end surface. Another advantage is that the electrical pads can be fabricated on the top surface, the first side surface, and the second side surface without additional processing steps.

The invention may include other exemplary embodiments described below.

DESCRIPTION OF THE DRAWINGS

The same reference number represents the same element on all drawings.

DETAILED DESCRIPTION OF THE INVENTION

FIGS. 2-9 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 2:
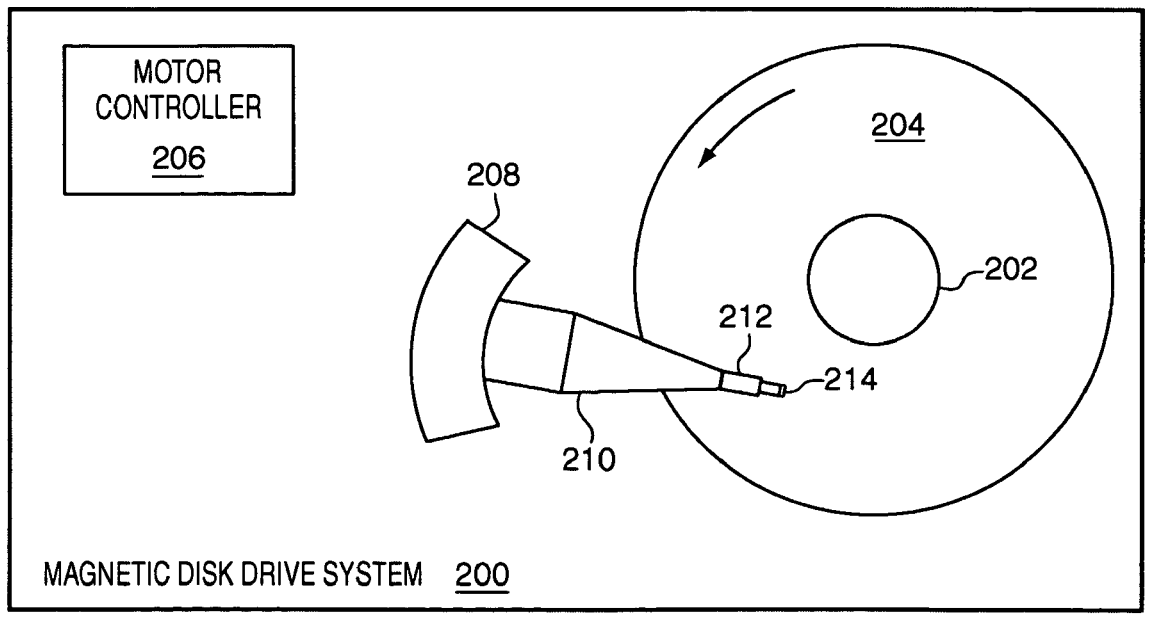
FIG. 2 illustrates a magnetic disk drive system in an exemplary embodiment of the invention.

FIG. 2 illustrates a magnetic disk drive system 200 in an exemplary embodiment of the invention. Magnetic disk drive system 200 includes a spindle 202, a magnetic disk 204, a motor controller 206, an actuator 208, an actuator arm 210, a suspension arm 212, and a recording head 214. Spindle 202 supports and rotates a magnetic disk 204 in the direction indicated by the arrow. A spindle motor (not shown) rotates spindle 202 according to control signals from motor controller 206. Recording head 214 is supported by suspension arm 212 and actuator arm 210. Actuator arm 210 is connected to actuator 208 that is configured to rotate in order to position recording head 214 over a desired track of magnetic disk 204. Magnetic disk drive system 200 may include other devices, components, or systems not shown in FIG. 2. For instance, a plurality of magnetic disks, actuators, actuator arms, suspension arms, and recording heads may be used.

When magnetic disk 204 rotates, air generated by the rotation of magnetic disk 204 causes an air bearing surface (ABS) of recording head 214 to ride on a cushion of air a particular height above magnetic disk 204. The height depends on the shape of the ABS. As recording head 214 rides on the cushion of air, actuator 208 moves actuator arm 210 to position a read element (not shown) and a write element (not shown) in recording head 214 over selected tracks of magnetic disk 204.

Figure 3:
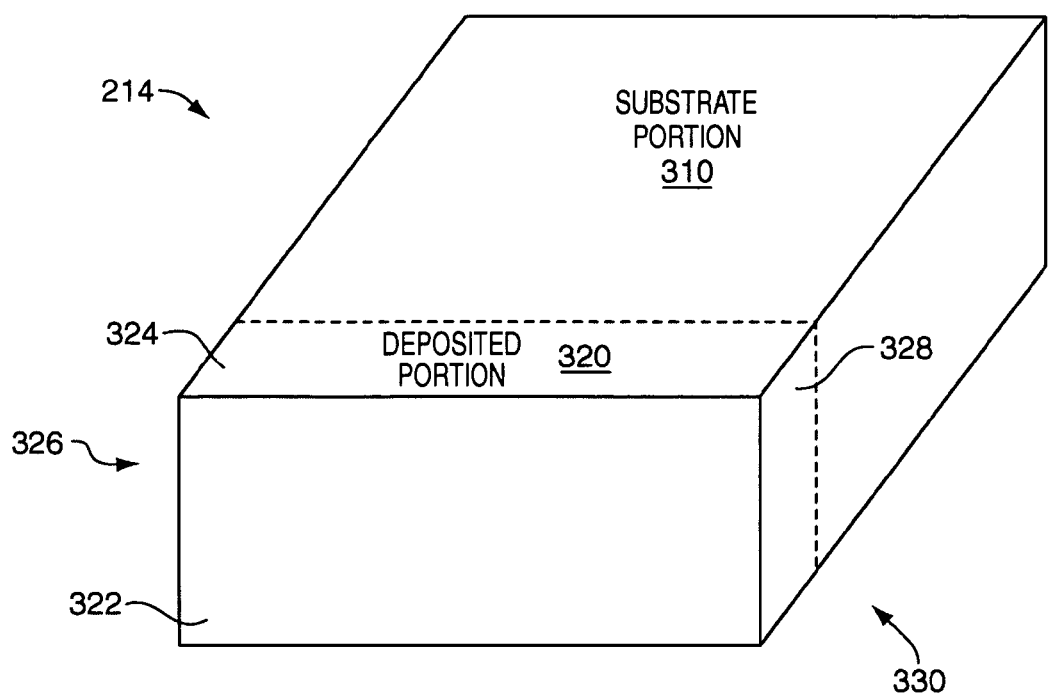
FIGS. 3-6 illustrate a recording head in an exemplary embodiment of the invention.

FIG. 3 illustrates recording head 214 in an exemplary embodiment of the invention. Recording head 214 includes a substrate portion 310 abutting a deposited portion 320. The view of recording head 214 shows the air bearing surface (ABS) 330 of recording head 214 facing downward with ABS 330 being the bottom surface of recording head 214 as recording head 214 sits on the page of FIG. 3.

Figure 1:
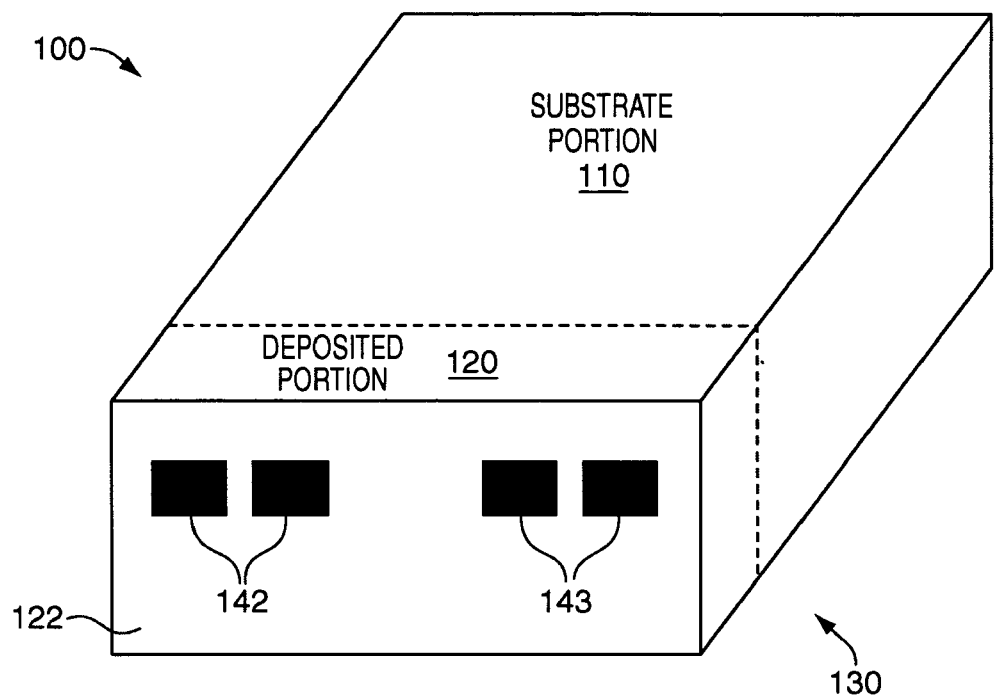
FIG. 1 illustrates a typical recording head.

In general, deposited portion 320 of recording head 214 has ABS 330, end surface 322, and at least one other surface, such as surfaces 324, 326, and 328. ABS 330 is known to those skilled in the art. End surface 322 is substantially perpendicular to ABS 330. End surface 322 is sometimes termed the trailing edge or trailing surface of recording head 214. End surface 322 traditionally has included the electrical pads for recording head 214, such as end surface 122 in FIG. 1. Those skilled in the art know end surface 322 to be the surface currently used for electrical pads. In accord with the invention, the other surface of the deposited portion 320 (e.g., surfaces 324, 326, and 328) includes one or more electrical pads for electrical elements in deposited portion 320. End surface 322 may also include electrical pads. The electrical pad on the other surface of the deposited portion 320 is included during the fabrication process of recording head 214.

FIG. 3 shows a recording head 214 having rectangular surfaces. The surfaces of deposited portion 320 are ABS 330, end surface 322, top surface 324, a first side surface 326, and a second side surface 328. ABS 330 is the bottom surface of deposited portion 320 in FIG. 3. Top surface 324 is substantially parallel to ABS 330 and is opposite to ABS 330 in deposited portion 320. Side surface 326 and side surface 328 are substantially parallel to one another, and connect ABS 330 to top surface 324 on opposite sides of deposited portion 320. As previously stated, electrical pads are traditionally on end surface 322 of deposited portion 320. In accord with the invention, electrical pads (not shown in FIG. 3) are deposited or included on other surfaces (other than just end surface 322). For instance, one or more of top surface 324, side surface 326, and side surface 328 may include electrical pads. Top surface 324 may include one or a plurality of electrical pads. Alternatively or additionally, side surface 326 may include an electrical pad. Alternatively or additionally, side surface 328 may include an electrical pad. Electrical pads may additionally be included on end surface 322 as in prior heads.

Recording heads may not have rectangular surfaces as shown in the FIG. 3 in which case the surfaces of deposited portion 320 are difficult to describe. The key is that electrical pads are included on surfaces of deposited portion 320 other than just end surface 322. Top surface 324 and side surfaces 326, 328 are examples of the surfaces available, but other equivalent surfaces may be available for electrical pads when the surfaces of recording heads have shapes other than a rectangle.

Figure 4:
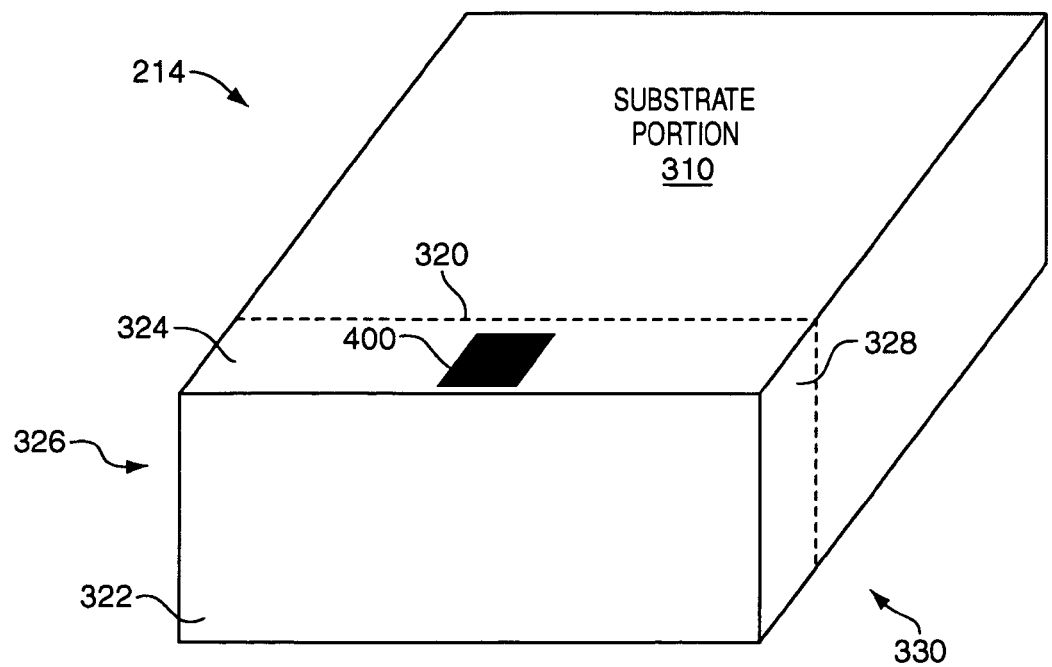

FIG. 4 illustrates recording head 214 with an electrical pad 400 deposited on top surface 324 in an exemplary embodiment of the invention. Although one electrical pad 400 is illustrated, more electrical pads may be deposited on top surface 324 as the available space allows. Electrical pad 400 may be connected to temporary electrical elements or permanent electrical elements in deposited portion 320. Temporary electrical elements comprise electrical elements used for processing or testing of recording head 214, but not used for operation of recording head 214 in a magnetic disk drive, such as electrical lapping guides. Temporary electrical elements may be permanently fabricated in a recording head, but the temporary electrical elements are not used for normal operation. Permanent electrical elements comprise electrical elements used for operation of recording head 214 in a magnetic disk drive, such as read elements, write elements, heaters, etc. Electrical pad 400 may be completely on top surface 324 as shown in FIG. 4. Alternatively, electrical pad 400 may be partially touching end surface 322 (see FIG. 7). Other electrical pads may be deposited on end surface 322 or one of side surfaces 326, 328 although not shown.

Figure 5:
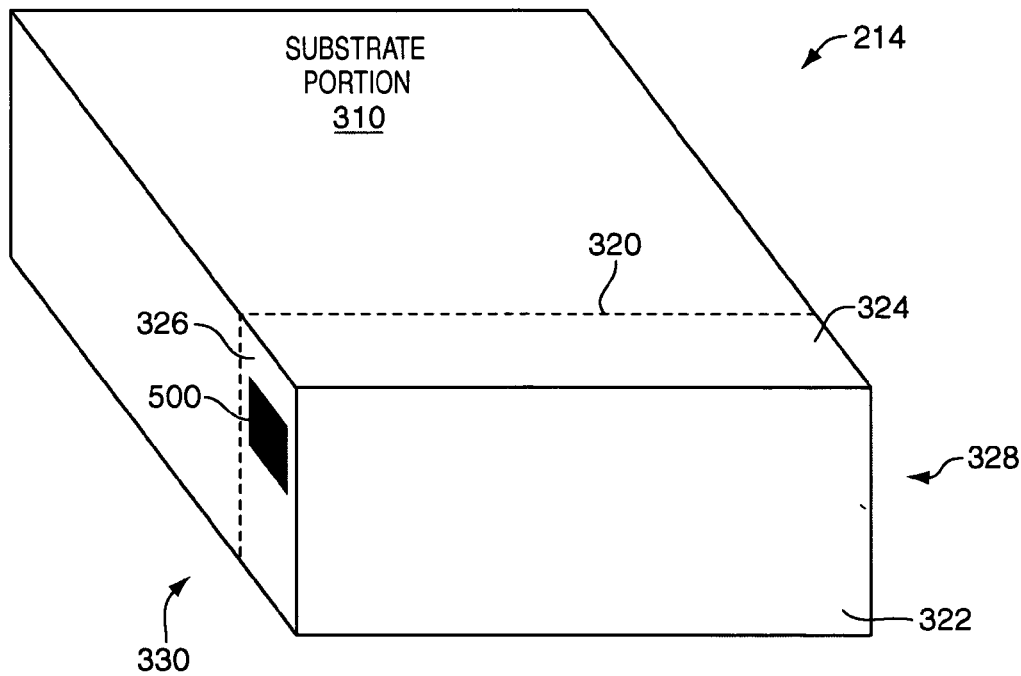

FIG. 5 illustrates recording head 214 with an electrical pad 500 deposited on side surface 326 in an exemplary embodiment of the invention. Although one electrical pad 500 is illustrated, more electrical pads may be deposited on side surface 326 as the available space allows. Electrical pad 500 may be connected to temporary electrical elements or permanent electrical elements in deposited portion 320. Electrical pad 500 may be completely on side surface 326 as shown in FIG. 5. Alternatively, electrical pad 500 may be partially touching end surface 322 (see FIG. 7). Other electrical pads may be deposited on end surface 322, top surface 324, or side surface 328 although not shown.

Figure 6:
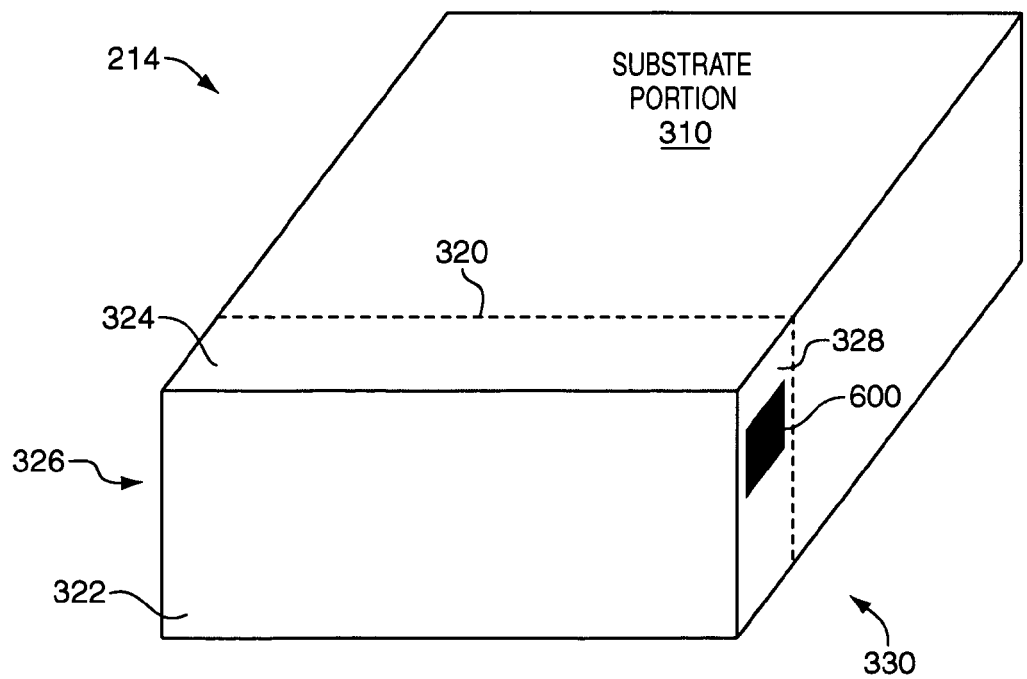

FIG. 6 illustrates recording head 214 with an electrical pad 600 deposited on side surface 328 in an exemplary embodiment of the invention. Although one electrical pad 600 is illustrated, more electrical pads may be deposited on side surface 328 as the available space allows. Electrical pad 600 may be connected to temporary electrical elements or permanent electrical elements in deposited portion 320. Electrical pad 600 may be completely on side surface 328 as shown in FIG. 6. Alternatively, electrical pad 600 may be partially touching end surface 322 (see FIG. 7). Other electrical pads may be deposited on end surface 322, top surface 324, or side surface 326 although not shown.

Figure 7:
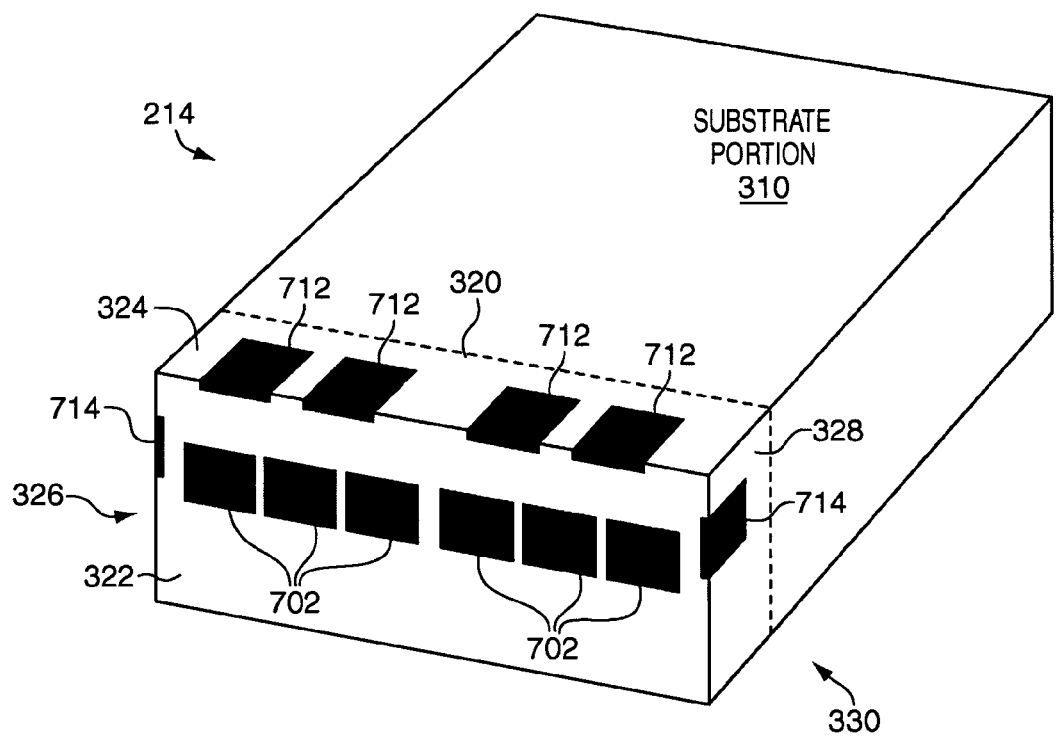
FIG. 7 illustrates another recording head in an exemplary embodiment of the invention.

FIG. 7 illustrates one possible embodiment of recording head 214. The invention is not limited to the configuration of recording head 214 as shown in FIG. 7, as this is just one possible embodiment. End surface 322 of recording head 214 includes six electrical pads 702. Electrical pads 702 on end surface 322 may be used for permanent electrical elements, such as a read element, a write element, and a heater. The dimensions of end surface 322 are approximately 700 microns wide and 300 microns high. Each electrical pad 702 is about 80 microns wide with about 30 microns between each electrical pad 702. With these dimensions, there is little or no room left on end surface 322 for more electrical pads 702.

In an improvement over prior recording heads, recording head 214 shown in FIG. 7 includes six more electrical pads on other surfaces of deposited portion 320. Top surface 324 includes four electrical pads 712, side surface 326 includes one electrical pad 714, and side surface 328 includes one electrical pad 714. Electrical pads 712, 714 may be used for temporary electrical elements, such as electrical lapping guides. By adding six electrical pads, head designers can advantageously include three electrical lapping guides in recording head 214 to improve lapping accuracy. Electrical pads 712, 714 are partially exposed on end surface 322 so that they are accessible for contact from the top of recording head 214 and partially from behind recording head 214 as shown in FIG. 8.

Electrical pads 712, 714 have the dimensions of approximately 80 microns×30 microns×5 microns. Deposited portion 320 is about 40 microns thick, so there is about a 10 micron space between substrate portion 310 and electrical pads 712, 714. This avoids smearing of electrical pads 712, 714 into substrate portion 310 during cutting.

Figure 8:
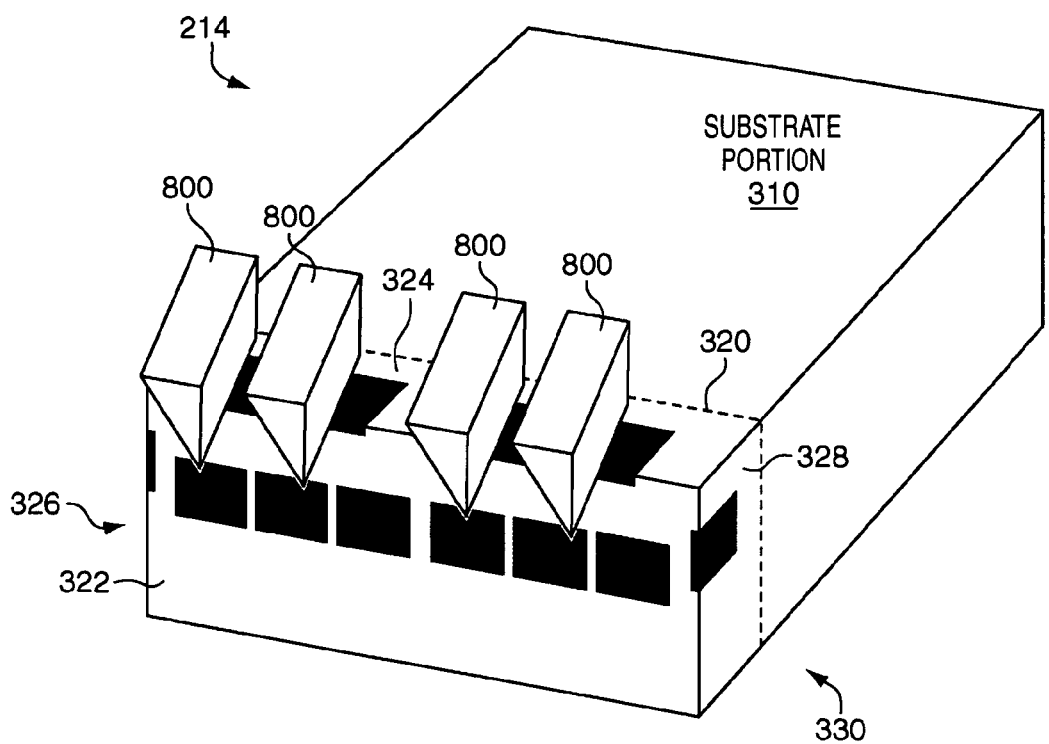
FIG. 8 illustrates probes contacting electrical pads on the recording head in an exemplary embodiment of the invention.

FIG. 8 illustrates probes 800 contacting electrical pads 712 in an exemplary embodiment of the invention. Assume for this embodiment that electrical pads 712 are for electrical lapping guides. Probes 800 contact electrical pads 712 during the lapping process to monitor the resistance change of the electrical lapping guides due to the lapping process. Because electrical pads 712 are partially exposed on end surface 322, slightly tilted probes 800 can contact electrical pads 712 without contacting any other surfaces.

Figure 9:
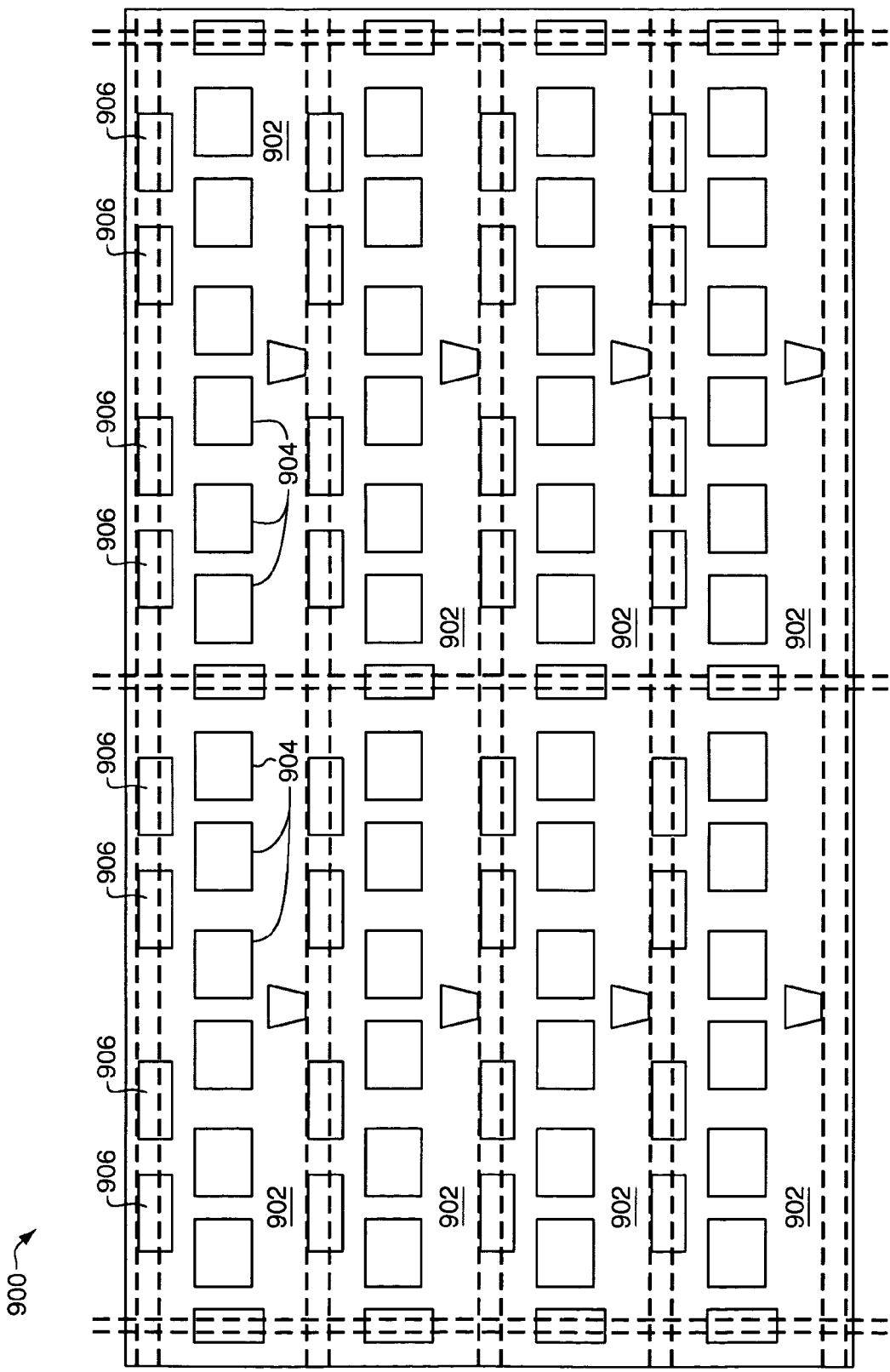
FIG. 9 illustrates how recording heads may be manufactured in an exemplary embodiment of the invention.

FIG. 9 illustrates how recording heads may be manufactured in an exemplary embodiment of the invention. FIG. 9 shows a portion of a wafer 900 from the deposited portion of the wafer. Wafer 900 includes a plurality of recording heads 902. Each recording head 902 includes a plurality of electrical pads 904 on an end surface of the recording head 902. Electrical connectors 906 are fabricated between the recording heads 902. Electrical connectors 906 are plated using Cu or another material having a thickness of 5-30 μm. The dotted lines on FIG. 9 illustrate where a cutting blade saw cuts wafer 900 into individual recording heads. The cutting combined with optional back side polishing exposes electrical pads 906 on surfaces other than just the end surface.

We claim:

1. A recording head of a magnetic disk drive system, the recording head comprising:
    a substrate portion; and
    a deposited portion abutting the substrate portion, the deposited portion comprising an air bearing surface, an end surface, and at least one other surface,
    wherein the at least one other surface includes an electrical pad connected to an electrical element in the deposited portion;
    wherein the end surface includes a plurality of electrical pads.

2. The recording head of claim 1 wherein the at least one other surface includes a top surface, a first side surface, and a second side surface, wherein at least one of the top surface, the first side surface, and the second side surface includes the electrical pad.

3. The recording head of claim 2 wherein the end surface is substantially perpendicular to the air bearing surface, the top surface is substantially parallel to the air bearing surface and is the opposite surface to the air bearing surface, and the first side surface and the second side surface are substantially parallel to one another and substantially perpendicular to the air bearing surface.

4. The recording head of claim 1 wherein the electrical element comprises one of a read element, a write element, and a heater.

5. The recording head of claim 1 wherein the electrical element comprises an electrical lapping guide.

6. The recording head of claim 1 wherein the electrical element comprises a temporary electrical element.

7. The recording head of claim 1 wherein the electrical element comprises a permanent electrical element.

8. The recording head of claim 1 wherein the electrical pad on the at least one other surface partially touches the end surface of the deposited portion.

9. The recording head of claim 1 further including at least a ten micron space between the electrical pad on the at least one other surface and the substrate portion.

10. A magnetic disk drive system, comprising:
    a magnetic disk; and
    a recording head comprising:
        a substrate portion; and
        a deposited portion abutting the substrate portion, the deposited portion comprising an air bearing surface, an end surface, and at least one other surface,
        wherein the at least one other surface includes an electrical pad connected to an electrical element in the deposited portion;
        wherein the end surface includes a plurality of electrical pads.

11. The magnetic disk drive system of claim 10 wherein the at least one other surface includes a top surface, a first side surface, and a second side surface, wherein at least one of the top surface, the first side surface, and the second side surface includes the electrical pad.

12. The magnetic disk drive system of claim 11 wherein the end surface is substantially perpendicular to the air bearing surface, the top surface is substantially parallel to the air bearing surface and is the opposite surface to the air bearing surface, and the first side surface and the second side surface are substantially parallel to one another and substantially perpendicular to the air bearing surface.

13. The magnetic disk drive system of claim 10 wherein the electrical element comprises one of a read element, a write element, and a heater.

14. The magnetic disk drive system of claim 10 wherein the electrical element comprises an electrical lapping guide.

15. The magnetic disk drive system of claim 10 wherein the electrical element comprises a temporary electrical element.

16. The magnetic disk drive system of claim 10 wherein the electrical element comprises a permanent electrical element.

17. The magnetic disk drive system of claim 10 wherein the electrical pad on the at least one other surface partially touches the end surface of the deposited portion.

18. A recording head of a magnetic disk drive system, the recording head comprising:
   a substrate portion; and
   a deposited portion abutting the substrate portion, the deposited portion comprising an air bearing surface, an end surface, a top surface, a first side surface, and a second side surface,
   wherein the end surface includes a plurality of electrical pads and at least one of the side surfaces includes at least one electrical pad.

19. The recording head of claim 18 wherein the first side surface includes an electrical pad and the second side surface includes an electrical pad.

20. The recording head of claim 18 wherein the plurality of electrical pads on the end surface are connected to permanent electrical elements in the deposited portion.

21. The recording head of claim 20 wherein the at least one electrical pad on the at least one of the side surfaces is connected to temporary electrical elements in the deposited portion.

22. A recording head of a magnetic disk drive system, the recording head comprising:
   a substrate portion; and
   a deposited portion abutting the substrate portion, the deposited portion comprising an air bearing surface, an end surface, a top surface, a first side surface, and a second side surface, wherein the end surface is substantially perpendicular to the air bearing surface, the top surface is substantially parallel to the air bearing surface and is the opposite surface to the air bearing surface, and the first side surface and the second side surface are substantially parallel to one another and substantially perpendicular to the air bearing surface;
   wherein the end surface includes a plurality of electrical pads and at least one of the side surfaces includes at least one electrical pad.

23. The recording head of claim 22 wherein the first side surface includes an electrical pad and the second side surface includes an electrical pad.

24. The recording head of claim 22 wherein the plurality of electrical pads on the end surface are connected to permanent electrical elements in the deposited portion.

25. The recording head of claim 24 wherein the at least one electrical pad on the at least one of the side surfaces is connected to temporary electrical elements in the deposited portion.

* * * * *